United States Patent [19]

Kopetzki et al.

[11] 4,013,117
[45] Mar. 22, 1977

[54] MULTI-START INVOLUTE REGENERATOR MATRIX DISK AND METHOD OF ASSEMBLING SAME

[75] Inventors: Nikolaus Kopetzki, Sterling Heights; Petro Mykolenko, Warren, both of Mich.

[73] Assignee: General Motors Corporation, Detroit, Mich.

[22] Filed: Feb. 6, 1976

[21] Appl. No.: 655,726

[52] U.S. Cl. .............................. 165/10; 29/157.3 R; 29/428; 29/445; 29/455 R; 228/139; 228/183

[51] Int. Cl.² ........................................ F28D 19/00

[58] Field of Search ............ 165/8, 10; 29/157.3 R, 29/428, 445, 455; 228/139, 183

[56] References Cited
UNITED STATES PATENTS

| 3,596,709 | 8/1971 | Dravnieks | 165/10 X |
| 3,875,994 | 4/1975 | Lewakowski et al. | 165/8 X |

Primary Examiner—Albert W. Davis, Jr.
Attorney, Agent, or Firm—Arthur N. Krein

[57] ABSTRACT

A multi-start involute regenerator matrix disk and method for assembling the same, the matrix disk including a hub mandrel with a plurality of matrix elements, each preferably including a matrix strip and a separator strip, in series orientation, endwise abutment against the hub mandrel and mechanically secured to the hub mandrel by a pair of annular pinch rings pressed into the opposite side edges of the matrix elements with the pinch rings positioned to encircle the hub mandrel radially outward thereof whereby to effect wedging of portions of the matrix elements against the outer peripheral surface of the hub mandrel, the matrix elements spirally encircling the hub mandrel in an involute configuration and bonded together to form a rigid elastic matrix structure.

6 Claims, 8 Drawing Figures

MULTI-START INVOLUTE REGENERATOR MATRIX DISK AND METHOD OF ASSEMBLING SAME

This invention relates to a regenerator matrix disk structure and, in particular to a multi-start involute regenerator matrix disk structure and to the method of fabricating the same.

Rotary regenerators, particularly of the axial flow type as used in gas turbine engines, may utilize heat transfer means in the form of a porous metal disk matrix which is rotated so that each element thereof passes successively through two aeriform fluid flow paths, absorbing heat from a hotter fluid and releasing it to a cooler fluid in these flow paths.

Metal matrices ordinarily are made up of corrugated metal sheets spirally wound into a disk and then brazed or otherwise bonded together so as to provide a rigid cellular or porous structure. This rigid cellular or porous structure is normally enclosed at the outer peripheral edge thereof by outer sealing rings or by an outer ring which provides a solid rim around the periphery around the matrix. Alternately, the outer peripheral edge of the matrix may be suitably secured to a driven ring gear in a known manner.

The conventional inner core structure or main heat transfer body of such an axial flow regenerator matrix disk involves alternating flat and corrugated strips or alternating corrugated strips which are spirally wound about a hub to form the main heat transfer body of the matrix. One example of such an alternating flat strip and corrugated strip structure is illustrated in U.S. Pat. No. 3,276,515 for "Gas Turbine Regenerator" issued Oct. 4, 1966 to James H. Whitfield. An example of a matrix structure using alternating corrugated strips is illustrated in U.S. Pat. No. 3,532,157 entitled "Regenerator Disk" issued Oct. 6, 1970 to William S. Hubble.

The process of forming such a matrix structure composed of a pair of strips spirally wound around a central core or hub is such that compressive loads are inherent in the critical make-up of the matrix structure, with each successive wrap of the strips adding to the load of those spiral wraps radially inward thereof toward the core and, for example, with a matrix diameter of 25 inches, this compressive load on the radially innermost wrap can be significant. Thus, both from the standpoint of manufacturing and service, such loading can produce undesirable results, such as fracturing, faults, voids and separations of the strips forming these wraps.

As an alternate to such a matrix structure, as above described, it has been proposed to use a plurality of pairs of strips spirally wound in an involute fashion around a central tubular core, in the form of a hub, in an effort to reduce the compressive loading on the radially innermost wraps of the matrix structure. This form of matrix structure can be referred to as a multi-start involute matrix structure. However, one of the problems encountered in forming such a multi-start involute matrix structure is in attaching the starting ends of the pairs of strips to the core or hub of the matrix disk. The complexity of attaching such pairs of strips to the core or hub can be readily appreciated when one considers that as many as 32 to 64 such pairs of strips may be attached to the outer periphery of a hub element prior to spiral wrapping of the strips around this hub element and that the material of these strips may be only approximately 0.002 inch thick.

It is therefore the primary object of this invention to provide an improved multi-start involute regenerator matrix disk whereby the starting ends of a plurality of matrix elements of such a regenerator structure are mechanically secured to the hub of such a matrix disk structure by means of pinch rings encircling the hub and pressed into opposite side edges of the matrix elements wedging them against the hub.

Another object of this invention is to provide an improved method of assembling a plurality of matrix elements to a hub whereby this attachment is effected by a pair of pinch rings to effect mechanical attachment of the starting ends of such matrix elements to a hub after they have first been held magnetically to a hub mandrel means.

A further object of this invention is to provide a multi-start involute regenerator matrix disk structure fabricated by using a pair of pinch rings to effect mechanical attachment of the matrix elements of such a structure to the central hub thereof, the matrix elements then being further secured to the hub by the use of a bonding medium.

A still further object of this invention is in the provision of an improved method for assembling a multi-start involute regenerator matrix disk structure which eliminates many of the fabricating complexities inherent in prior methods of assembling such a regenerator matrix disk structure.

These and other objects of the invention are obtained in a multi-start involute regenerator matrix disk structure having a hub and a plurality of matrix elements spirally wraped thereabout, each of the matrix elements preferably including a corrugated matrix strip and a separator strip, the latter in the final assembly being disposed between adjacent corrugated matrix strips, wherein the matrix disk structure is fabricated by a method including the steps of magnetizing a hub mandrel means, feeding individual pairs of said corrugated matrix strips and alternating separator strips in series orientation into endwise abutment against the outer peripheral surface of the hub mandrel means to be retained magnetically thereto, mechanically securing the corrugated matrix strips and separator strips to the hub of the hub mandrel means by pressing annular pinch rings into opposite edges of the thus prior magnetically retained matrix strips and separator strips with the pinch rings positioned concentrically and radially outward of the hub but closely adjacent thereto to effect wedging of the matrix strips and separator strips against the outer peripheral surface of the hub, de-magnetizing the corrugated matrix strips and separator strips, spirally wrapping the corrugated matrix strips and the separator strips about the hub in an involute configuration and, then bonding the matrix strips and separator strips together into a rigid elastic structure integral with the hub.

For a better understanding of the invention, as well as other objects and further features thereof, reference is had to the following detailed description of the invention to be read in connection with the accompanying drawings, wherein.

Figure 2:
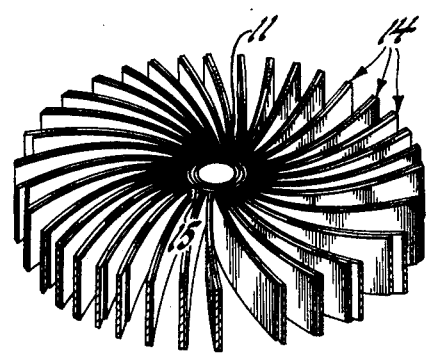
FIG. 2 is a top perspective view of a regenerator matrix disk structure showing the mechanical attachment of a plurality of matrix elements to the disk hub prior to the spiral wrapping of the matrix elements about the hub in an involute configuration and bonding of the matrix elements thereto.
Figure 5:
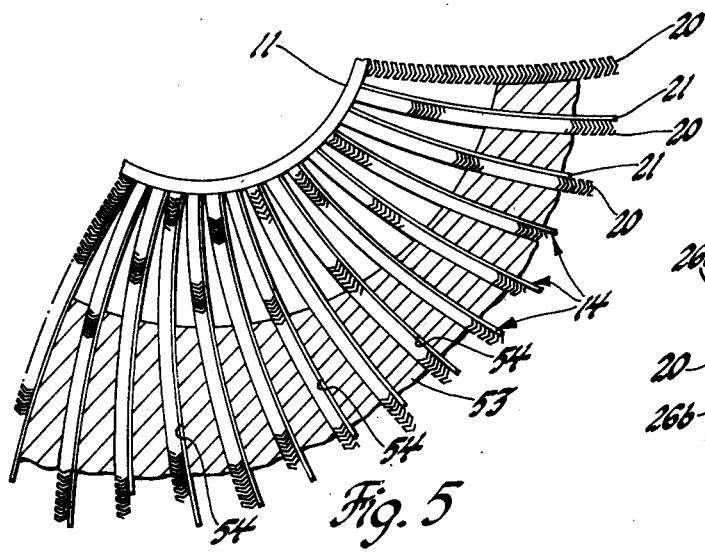
Figure 6:
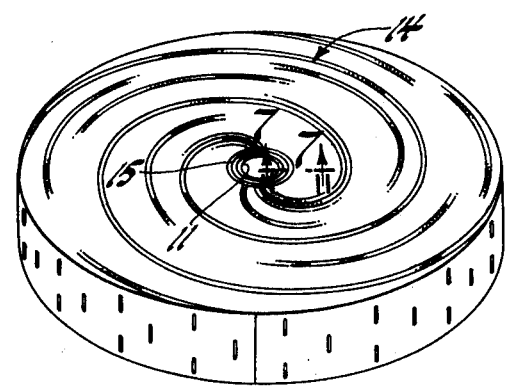
Figure 7:
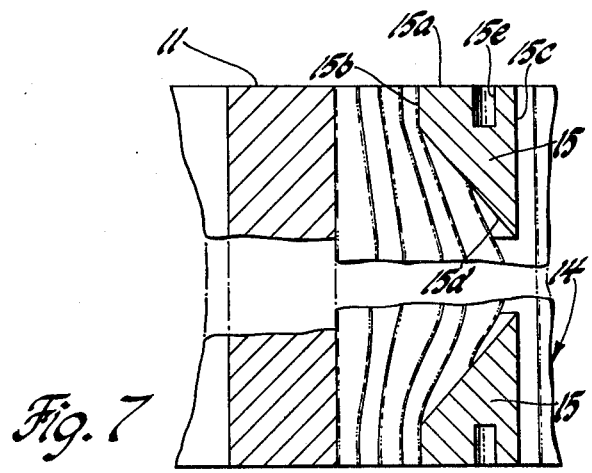
Figure 4:
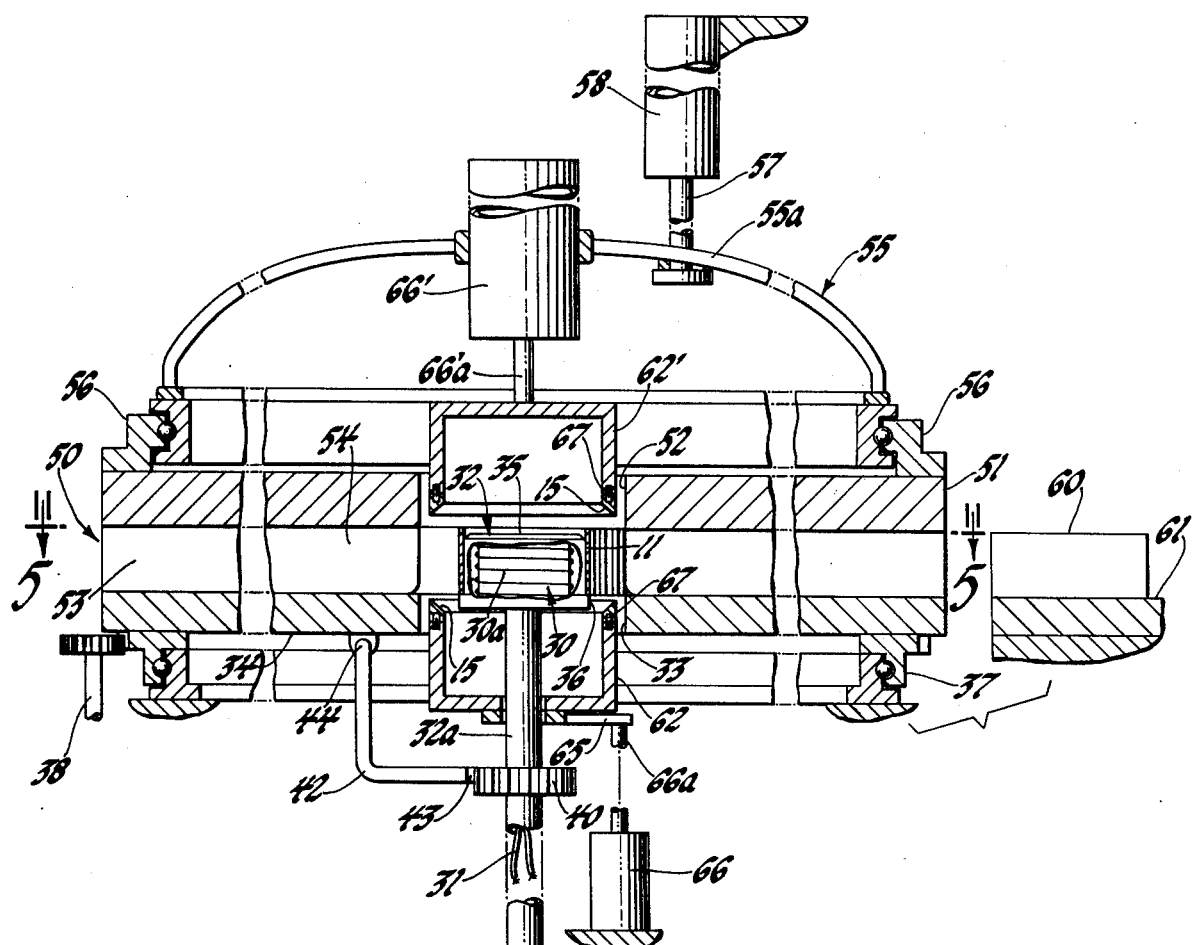
Figure 8:
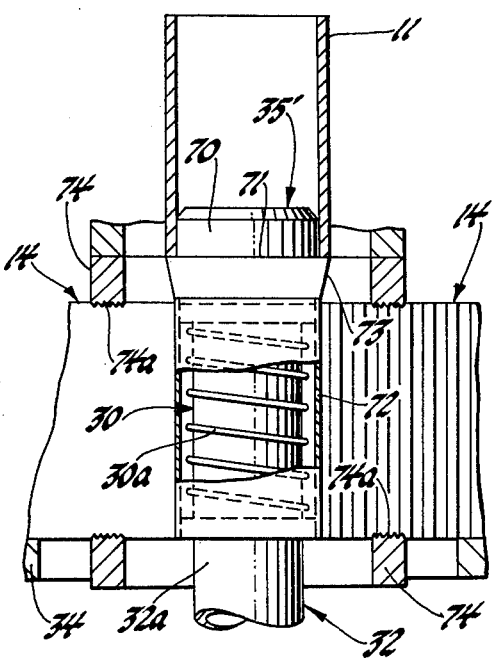

FIG. 4 is a schematic view, partly in section, showing an assembly apparatus for assembly of the matrix disk structure, the apparatus including means for feeding matrix elements into endwise abutment with a hub mandrel means to be magnetically retained thereagainst and apparatus for forcing the pinch rings into opposite edges of the matrix elements whereby to wedge them into mechanical engagement with the outer periphery of the disk hub;

FIG. 5 is a sectional view of the guide carousel of the apparatus of FIG. 4 taken along line 5—5 of FIG. 4;

FIG. 6 is a top perspective view showing the matrix disk structure of FIG. 2 with the matrix elements thereof spirally wrapped and secured in an involute configuration around the hub;

FIG. 7 is a sectional view of the matrix disk structure of FIG. 6 taken along line 7—7 of FIG. 6; and, FIG. 8 is a view of an alternate hub mandrel means from that illustrated in FIG. 4.

Figure 1:
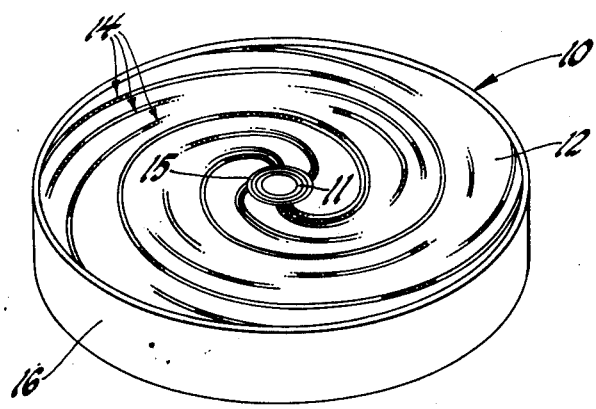
FIG. 1 is a top perspective view of a multi-start involute regenerator matrix disk structure assembled in accordance with the subject invention, the matrix elements of this structure being shown schematically because of their relatively small size compared to the overall diameter of the matrix disk structure.

Referring now to the drawings, there is shown in FIG. 1 an axial flow regenerator matrix disk structure 10. Since such a regenerator matrix disk structure may be over 2 feet in diameter with a thickness of only about 3 inches, it will be apparent that the illustration thereof in FIG. 1 is exaggerated to show the separate elements, to be described, of this structure.

The matrix structure 10 includes a cylindrical hub mandrel 11 which may include means, not shown, for connecting the hub mandrel to a matrix driving shaft, such as disclosed in U.S. Pat. No. 3,476,173 for "Rotary Regenerator Matrix Mount and Drive" issued Nov. 4, 1969 to Joseph W. Bracken, Jr. and William S. Hubble. The matrix further includes a cylindrical or disk-shaped main body or inner core 12 of heat transfer material which, in accordance with the invention, is formed by a plurality of matrix elements 14, to be described in detail hereinafter, which are secured at one end by pinch rings 15, to be described, to the outer periphery of the hub mandrel 11 and spirally wrapped around the hub mandrel in an involute configuration so as to define passages extending generally axially of the matrix. In the structure shown, the matrix 10 also includes an outer rigid rim 16, herein shown as a one-piece ring with which the rim seals, not shown, of the regenerator cooperate, the rim extending around the outer periphery of the inner core 12 of the matrix. It should be realized, however, that the rigid rim 16 could, if desired, be replaced by a ring gear or, alternately, the matrix structure could terminate, if desired, at the outer periphery of the inner core 12.

Each matrix element 14 of the inner core 12 preferably includes a corrugated strip 20 and a flat separator strip 21, although it should be realized that, as disclosed in the above identified U.S. Pat. No. 3,532,157, a shallow-corrugated strip could be used in lieu of a flat separator strip.

Figure 3:
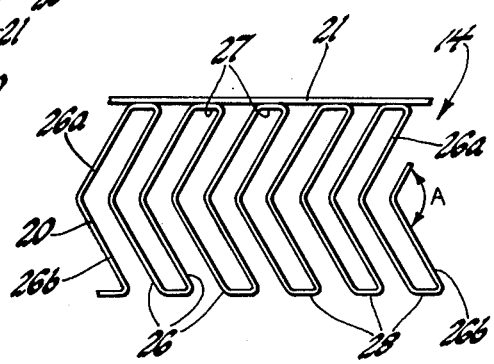
FIG. 3 is an enlarged top view of a preferred embodiment of a portion of a matrix element used in the regenerator matrix disk structure of FIG. 1; the matrix element including a matrix strip and a separator strip.

Although the corrugated strip 20 may be of any desired corrugated configuration, in the preferred embodiment illustrated with particular reference to FIG. 3, the corrugated strip 20 is in the form of a chevron matrix strip which includes closely spaced apart, substantially parallel fins 26 interconnected to each other at alternating ends, each fin 26 including diagonal first and second fin portions 26a and 26b, respectively, meeting together at an obtuse angle A, with each first fin portion 26a of a fin being connected by a flat crest 27 to the first fin portion 26a of the next adjacent fin on one side thereof and the second fin portion 26b thereof being connected by a flat valley 28 to the second fin portion 26b of the next adjacent fin on the opposite side thereof, the included angle A between each first and second fin portion of a fin being approximately 120° and the flat crests 27 and flat valleys 28 being substantially parallel to each other.

In a particular embodiment, this chevron matrix strip, described above, is fabricated from a 0.002 inch thick metal foil having a width of three inches and is provided with 93 fins per 2 inches of chevron matrix strip material and, the height of the chevron matrix strip, that is, the distance from a flat crest 27 to a flat valley 28, was 0.129 inch. The flat separator strip 21 is made of stock material having a corresponding thickness. Accordingly, it should be realized that the chevron matrix strip 20 together with the separator strip 21, as shown in FIG. 3, have each been greatly enlarged whereby to show the details of this chevron matrix strip structure.

In fabricating the matrix disk structure 10, each of a plurality of matrix elements 14, each of a desired predetermined length, has one end or starting end thereof secured, in a manner to be described, to the outer peripheral surface of the hub mandrel 11 with the matrix elements in closely spaced parallel relationship to each other, as seen in FIG. 2. The number of such matrix elements 14 used in a particular matrix core structure would, of course, depend at least in part, for example, on the outer peripheral surface dimensions of the hub mandrel 11. A preferred embodiment of a matrix disk, made in accordance with the invention, contained 64 matrix elements. Each matrix element 14 will be secured to the hub mandrel 11 so that, after fabrication of the matrix disk structure, the corrugations of each of the corrugated strips 20 will define passages extending generally axially of the matrix through these corrugations. In the embodiment of the matrix strip illustrated, the arrangement of the matrix elements 14 is such that the flat separator strip 21 of one matrix element will face the flat valley 28 of the matrix strip 20 in the next adjacent matrix element, whereby after these matrix elements are spirally wound about the hub mandrel 11, this flat separator strip 21 will abut against the flat valleys 28 of the matrix strip of the next adjacent matrix element, and the flat separator strip 21 of this next adjacent matrix element will, of course, as previously described, engage the flat crest 27 of its matrix strip.

As will be apparent, each matrix strip 20 and separator strip 21 of a matrix element 14 will have a starting end, which abuts against the hub mandrel 11, and a terminal end. Preferably, when using a matrix strip 20 in the form of a chevron strip, the starting end of such a matrix strip is a fin 26 thereof to provide for a maximum surface area of this element to abut against the hub mandrel 11. In addition, the separator strip 21 of at least one matrix element 14 is of a greater length than the matrix strip 20 of this element and of a sufficient length so that during winding, the terminal end of this separator strip may be wrapped for at least one additional revolution about the remaining strips after termination of the wrapping of the matrix strips 20 and other separator strips 21 and then this separator strip would be stapled or otherwise secured to the other strips whereby to temporarily retain all of these elements together prior to their being permanently secured together, as by brazing.

In accordance with the invention, each of the matrix elements 14 is fed in a suitable manner, by hand or otherwise, into endwise abutment against the outer peripheral surface of the hub mandrel 11 or other mandrel means, to be described, to abut thereagainst substantially parallel to the axis thereof whereby the one end or starting end of each matrix element 14 can be retained magnetically to the hub mandrel or other mandrel means which is, during assembly, temporarily magnetized for this purpose as, for example, by positioning an electromagnet 30, as shown in FIGS. 4 and 5, within the center of the hub mandrel 11 or other mandrel means. As is well known, the electromagnet coil 30a would be connected by electrical lead wires 31 to a suitable source of electrical power, not shown, whereby the electromagnet can be selectively energized or de-energized, as desired. It will be realized, of course, that the individual components of each of the matrix elements 14 is fabricated from a suitable material which can be magnetized.

After the desired number of matrix elements 14 have been positioned in endwise abutment against the outer periphery of the hub mandrel 11, the matrix elements are then mechanically secured to the hub mandrel by a pair of annular pinch rings 15. As best seen in FIG. 7, each annular pinch ring 15 is, in cross section, in the form of a quadrilateral having a flat base 15a with unequal length, spaced apart, inboard and outboard sides 15b and 15c, respectively, extending at right angle therefrom with an inclined wedge side 15d connecting the opposite ends of the sides 15b and 15c. The wedge side 15d thus presents a wedge surface facing radially inward or inboard a desired predetermined angle relative to the side 15c, and the sharp corner at the junction of the wedge side 15d and side 15c provides a somewhat chisel point or edge for the pinch ring. To effect mechanical attachment of the matrix elements to the hub mandrel, each pinch ring is positioned concentrically of the hub with its chisel point positioned to engage an edge surface of the matrix elements 14, with one pinch ring on one side or bottom of the matrix elements and the other pinch ring on the opposite side or top of the matrix elements, and then the pinch rings are forced, in a suitable manner, into the matrix elements 14 until the flat base 15a of each pinch ring lies substantially in the plane of the corresponding edges of the matrix elements 14 with which it is associated.

Although the partly completed matrix disk structure, as shown in FIG. 2, can be substantially assembled manually, except of course for the use of an electromagnet, it is desirable in order to effect more accurate placement of the matrix elements 14 about the hub to perform the subject assembly method on a suitable assembly table using a guide arrangement to effect accurate feeding of the matrix elements endwise into abutment with the hub mandrel 11 or other mandrel means in a manner to be described.

The hub mandrel 11 in this embodiment is actually the element about which the matrix elements are spirally wrapped in involute configuration in the assembled construction of the matrix disk structure and, accordingly, in the following description of the method for assembling the matrix disk structure, this hub mandrel 11 will hereinafter be referred to as the hub mandrel or primary mandrel for a purpose which will become apparent.

In one of the steps in the assembly of the matrix disk structure, the matrix elements 14 are fed in series orientation into endwise abutment against the outer peripheral surface of a suitable hub mandrel means which, in the case of a hub mandrel made of non-magnetic material, such as a non-ferrous metal, may be the hub mandrel 11 per se, which would be then suitably magnetized during this assembly step as by having an electromagnet removably positioned therein; or this same type of hub mandrel 11 of non-magnetic material can serve as a primary mandrel which is removably supported on a secondary mandrel, also made of non-magnetic material, having an electromagnet incorporated therein. On the other hand, if the hub mandrel 11 is made of a magnetic material, such as a ferrous metal, then it is desirable to feed the matrix elements into direct abutment against the outer peripheral surface of a suitable secondary mandrel, also made of non-magnetic material having an electromagnet incorporated therein, which would then be retracted after assembly of the matrix elements to permit insertion of the hub mandrel 11 or primary mandrel into the thus previously assembled structure of matrix elements 14.

A construction of an apparatus suitable for use in assembling the subject matrix disk structure, having a hub mandrel 11 of non-magnetic material, is shown schematically in FIGS. 4 and 5. As best seen in FIG. 4, the electromagnet 30 is formed as part of a mandrel means or secondary mandrel mechanism, generally indicated 32, which is suitably supported in position to extend through a central aperture 33 in a circular support table 34. As shown, the actual secondary mandrel 35 of the mandrel mechanism 32 projects upward from the support table 34 and the support flange 36 of this mandrel mechanism lies substantially in a common plane with the upper surface of the support table 34 whereby the hub mandrel or primary mandrel 11 can be supported by the secondary mandrel 35 centrally relative to the support table when the mandrel mechanism is in the position shown. The secondary mandrel 35 may be in the form of a split collet type mandrel or it may otherwise be provided with means, such as a press fit to the hub mandrel 11, to effect a drive connection between it and the hub mandrel 11 for a purpose which will become apparent. In addition, the secondary mandrel 35, of cylindrical configuration, is made of a suitable non-magnetic material to enclose the electromagnet 30 and the coil 30a.

In the construction shown, the support table 34 is rotatably supported as by means of a combined ring bearing and ring gear, generally designated 37, whereby this support table can be rotated through a single complete revolution, during each assembly cycle, by a gear drive arrangement 38, which preferably includes a conventional index mechanism, not shown, since it forms no part of the subject invention.

In a preferred construction, the mandrel mechanism 32 is suitably supported in a conventional manner, not shown, for rotation either with the support table 34, in a manner to be described, or independently of the support table 34 and it is further mounted so as to permit movement of the secondary mandrel 35 in a direction coaxial with the axis of the support table whereby the secondary mandrel 35 can be moved from an assembly position, the position shown in FIG. 4, whereby the secondary mandrel 35 projects above the support table 34 to a retract position wherein the secondary mandrel lies in a position below the upper surface of the support table 34, for a purpose which will become apparent. Any suitable mechanism can be used to selectively effect rotation of the mandrel mechanism 10 with the support table as, for example, by having a coupler, such as a gear 40, fixed to the lower shaft extension 32a of the mandrel mechanism 32, the gear 40 being positioned so as to be engaged by a movable drive arm 42 having a toothed end 43 for engagement with the gear 40 and having its other end pivotally connected to the support table as at 44 for rotation therewith. The drive arm 42 may be manually moved into and out of engagement with gear 40, or other means, not shown, may be used to effect positioning of the drive arm. It will be apparent that when the drive arm 42 is in the position shown in FIG. 4, the mandrel mechanism 32 is coupled to the support table to be driven thereby, but when the drive arm 42 is pivoted about its pivot connection to the support table 34 in a clockwise direction, with reference to FIG. 4, the mandrel mechanism is, in effect, uncoupled from the support table whereby it may be freely rotated relative to the support table.

To effect independent rotation of the mandrel mechanism 32, in the construction shown, the lower shaft portion 32a of the mandrel mechanism has a gear 45 fixed thereto adjacent to its lower end. This gear 45 is positioned to be selectively driven by a suitable drive mechanism, such as the gear rack drive unit 46 having a gear rack 46a which is movable between a pair of stops 46b, only one being shown in FIG. 4, to limit travel of the gear rack in both directions. As shown, the gear rack 46a, which extends through the main housing of the gear rack drive unit 46, is positioned to be moved into and out of engagement with the gear 45. Axial movement of the mandrel mechanism 32 is effected, for example, by a reciprocable power unit, such as the air cylinder 47 with the piston rod 47a thereof suitably coupled to the lower shaft portion 32a of the mandrel mechanism with a thrust bearing 48 positioned therebetween whereby to permit rotation of the mandrel mechanism 32 relative to the piston rod 47a.

To effect accurate guidance of the individual matrix elements 14 into endwise abutment with the hub mandrel 11, there is provided a guide carousel, generally designated 50, which in the construction shown is adapted to be moved to a position on the support table 34 for rotation therewith or to be moved out of operative relationship with the support table, for a purpose to be described. The guide carousel 50 is of a diameter corresponding to the diameter of the support table 34 and it includes an upper circular guide plate 51 having a central, enlarged aperture 52 therethrough, and it further includes an apertured guide block ring 53 depending from one side, the lower side with reference to FIG. 4, of the guide plate 51.

As best seen in FIG. 5, the guide block ring 53, which is of a predetermined thickness greater than the width of the matrix elements 14 or the axial length of the hub mandrel 11, is provided with a plurality of equally spaced apart grooves 54 extending radially therethrough to the guide plate 51 so that when the guide carousel 50 is supported on the support table 34, there is provided a desired plurality of guide chutes, closed on opposite sides by the support table 34 and guide plate 51, each of which will slidably receive a matrix element 14. Thus, each of the guide chutes extends radially through the guide block ring 53, in equally spaced apart relation to each other and each is preferably in the form of a curved arc, whereby to slidably guide the matrix elements 14 into endwise abutment against the outer peripheral surface of the hub mandrel with the matrix elements thus partly curved in an involute spiral configuration, as seen in FIG. 5.

In the construction illustrated, the guide carousel 50 is rotatably carried on a support 55 by a ring bearing 56, one race of the ring bearing being fixed to the upper surface of the guide plate 51 while the other race of the ring bearing is fixed to the lower surface of the outer annular rim ring of support 55. Suitable means are provided to effect movement of the guide carousel 50 into and out of operative relationship with the support table 34 as by having a web arm 55a of the support 55 fixed to the end of the piston rod 57 of a reciprocable power unit, such as hydraulic motor 58, which is suitably fixed in position above the support table 34 and, of course, above the guide carousel 50. With this arrangement, the guide carousel 50, as previously described, can be selectively positioned to be either supported on the support table 34 for rotation therewith or it can be raised to a position out of operative relationship with the support table 34, this latter position being a sufficient distance above the support table to permit the removal of a fabricated matrix disk from the support table 34.

During the initial assembly operation in the fabrication of a matrix disk, the guide carousel 50 would be positioned, as shown in FIG. 4, on the support table 34 for rotation therewith whereby each individual guide chute can be rotatably indexed into and then out of registration with a guide chute 60 on a rigid feed-in table 61. As shown, the feed-in table 61 is positioned adjacent to the rotatable support plate 34 whereby an operator or a suitable feed mechanism, not shown, can sequentially feed matrix elements 14 through the guide chute 60 into registration with a guide chute provided by the guide grooves 54 in the guide block ring 53 for advancement into endwise abutment against the hub mandrel 11. Of course, the electromagnet coil 30a of the electromagnet within the secondary mandrel 35 would be energized during feeding of the matrix elements. The support table 34 during this assembly cycle would be appropriately indexed through one complete revolution whereby a matrix element 14 would be fed through each of the guide chutes into abutment with the hub mandrel 11.

After a full complement of matrix elements have been fed into endwise abutment against the hub mandrel 11 and magnetically retained thereagainst by the magnetic force generated by the electromagnet 30, the pinch rings 15 can then be forced into the opposite sides of the matrix elements 14 whereby to then mechanically secure the matrix elements to the hub mandrel 11 by the deformation and wedging of the matrix elements 14 against the outer peripheral surface of the hub mandrel 11, in the manner shown in FIG. 7.

In the construction illustrated, this is accomplished by having one of the pinch rings 15, the lower pinch ring with reference to FIG. 4, supported on the annular end face of a cup-shaped pinch ring support 62 positioned concentric to the mandrel mechanism 32 for movement between a first position in which the pinch ring 15 is spaced a predetermined distance axially away from the hub mandrel 11 and the matrix elements 14 on the support table 34 to a position at which the pinch ring is embedded into the matrix elements 14, as previously described. Thus in the structure shown, the pinch ring support 62 is fixed to a support bracket 65 that is operatively connected to the movable element, such as the piston 66a of a fixed reciprocable power element, such as hydraulic cylinder 66, that is selectively operable to effect movement of the pinch ring support 62 whereby the pinch ring 15 is moved between the previously described positions. Suitable means are provided on the pinch ring support 62 to effect alignment and releasable retention of a pinch ring thereon as by having bent spring pins 67 projecting outward thereof for engagement into apertures 15e provided for this purpose in the base 15a of the pinch ring. The other or upper pinch ring 15 is also suitably supported by pinch ring support 62', this support being fixed to the free end of the piston 66'a of a reciprocable power element, such as hydraulic cylinder 66', fixed for example to the inner rim of the support 55 for movement therewith.

After the above operation, the power unit 58 would be energized whereby to move the guide carousel 50 from the position shown in FIG. 4 to a position at which the guide carousel would be positioned above the thus far fabricated matrix disk structure to thereafter permit winding of the matrix elements 14 about the hub mandrel 11, in a manner to be described, while it is still supported on the above described assembly apparatus. In addition, the toothed end 43 of the drive arm 42 would be disconnected from the gear 40 on the mandrel mechanism 32 at this time and, of course, the electromagnet 30 can now be de-energized at this time unless it is to be used to effect a drive connection to the hub mandrel 11 during winding of the matrix elements about the hub, in which case it would not be de-energized until this latter fabrication step is completed.

To complete fabrication of the matrix disk structure, the hub mandrel 11, with the matrix elements 14 secured thereto by the pinch rings 15, in the manner previously described, is then rotated while the free ends of the matrix elements are held under tension in a known manner, not shown, to permit winding of the matrix elements spirally in an involute configuration about the hub mandrel 11 until a predetermined, required, unfinished core diameter is achieved. After winding of the matrix elements 14 about the hub mandrel 11, the free ends of these matrix elements are then secured to each other as by stapling, as shown in FIG. 6, or by the use of a suitable band, not shown, in a known manner around the outer periphery of the thus far assembled matrix core. In the structure shown, the spiral winding can be effected by holding the hub mandrel 11 stationary while the matrix elements are spirally wound about the hub as by rotation of the support table 34 or, preferably, the support table 34 is held stationary while the mandrel mechanism 32 is rotated relative thereto in the desired direction of rotation.

The above described assembly of hub mandrel 11, pinch rings 15 and matrix elements 14 forming the core 12, may then be removed from the secondary mandrel 35 as by moving the mandrel mechanism 32 in an axial direction out of engagement with the hub mandrel 11, after which the plurality of matrix elements 14 and the components thereof are brazed or otherwise bonded together and to the hub mandrel 11, in a known manner, so as to provide a rigid circular or porous matrix structure. After bonding together of the matrix elements 14, the outer periphery of the core 12, formed by the now bonded together matrix elements 14, is machined to a desired outer finished diameter for the core 12. After being machined, an outer rigid rim 16, or ring gear, if desired, may be attached to the outer peripheral surface of the core 12 in a known manner.

In a matrix disk structure wherein it is desired to use a hub mandrel 11 therein made of readily magnetizable material, such as of a ferrous material, it is necessary during assembly to employ a mandrel means made of non-magnetic material and enclosing an electromagnet whereby the fields of magnetic force generated by the electromagnet can be used to magnetically retain the matrix elements fed into endwise abutment thereagainst. Such a secondary mandrel for use in fabricating a matrix disk structure having a hub mandrel 11 made of magnetic material is shown in FIG. 8 and is identified therein by the reference numeral 35', such a secondary mandrel 35 being readily adapted for use with the previously described assembly apparatus of the type shown schematically in FIGS. 4 and 5.

Thus, with reference to FIG. 8, such a secondary mandrel 35', made of a suitable non-magnetic material, can include an upper stub shaft 70 of a diameter to slidably receive the hub mandrel 11 thereabout, the hub mandrel being retained axially thereon by means of an annular flanged shoulder 71 extending radially outward from the lower end of the upper stub shaft 70, the shoulder 71 being of a predetermined outside diameter that is preferably slightly larger than the outside diameter of the hub mandrel 11 and thus would correspond substantially to the outside diameter of the hub mandrel 11. This secondary mandrel further includes a lower cylindrical mandrel portion 72 of a smaller outside diameter than the outside diameter of the hub mandrel 11 and it is connected to the outside edge of the flanged shoulder 71 by an annular tapered shoulder 73 which can function as a wedge for a purpose which will become apparent.

In use, the secondary mandrel 35' would be positioned relative to the support table 34, as shown in FIG. 8, whereby the lower cylindrical mandrel portion 72 would be positioned to receive the matrix elements 14 into abutment thereagainst to be retained thereagainst by energization of the electromagnet 30 within this mandrel portion 72 and, in this position, the primary mandrel or hub mandrel 11 would, in the construction shown, be positioned temporarily above these matrix elements. After all the matrix elements have been fed into endwise abutment against the outer peripheral surface of the mandrel portion 72, if desired, opposite edges of these matrix elements could then be gripped by the grip rings 74 whereby the serrated edges 74a thereof would grip into the matrix elements to permit spiral winding of these matrix elements about the mandrel portion 72 of secondary mandrel 35'. These grip rings 74 could, for example, be supported in the same manner as the pinch rings 15, as shown in FIG. 4, whereby they can be moved into and out of engagement with the matrix elements, as necessary. After spiral winding of the matrix about the mandrel, the ends of these matrix elements are secured together as by stapling, in the manner previously described. Then, either before or after removal of these grip rings 74, the mandrel mechanism 32 will then be retracted whereby, as the secondary mandrel 35' is lowered, with reference to FIG. 8, relative to the matrix elements 14, the annular tapered shoulder 73 thereof, being of larger diameter than the mandrel portion 72, will flex the ends of the matrix elements 14 radially outward sufficiently to enlarge the opening whereby the primary mandrel or hub mandrel 11 can be dropped into the enlarged opening formed by the passage of the shoulder 73 in an axial direction ahead of the hub mandrel 11 through the opening defined by the inboard ends of the matrix elements. Since both the matrix strips 20 and the separator strips 21 are made of relatively thin material, it will be apparent that during passage of the shoulder 73 in an axial direction relative to the ends of these matrix elements, the components of these matrix elements will flex radially outward and then back radially inward to tightly grip the hub mandrel 11 after it is inserted into this matrix disk structure. After the hub mandrel 11 is axially positioned to provide a hub for the matrix structure and after removal of the grip rings 74, the pinch rings 15 can then be forced into opposite side edges of the matrix elements 14, in the manner previously described, whereby to further wedge the matrix elements 14 into abutment against the hub mandrel 11 whereby the matrix elements are then mechanically secured to the hub mandrel 11. After this, the matrix elements 14, hub mandrel 11 and the pinch rings 15 are then bonded to each other, as by brazing in a well known manner, to form a rigid elastic matrix disk structure.

It will be apparent from the above description that, in accordance with the subject invention, the pinch rings 15 can be inserted either before or after spiral winding of matrix elements 14 around a mandrel means without departing from the scope of the invention.

What is claimed is:

1. A regenerator matrix structure including a central hub mandrel, a plurality of matrix elements, each said matrix element having one end thereof in abutment against said hub mandrel and being spirally wound in involute configuration about said hub mandrel, each of said matrix elements including in series a chevron strip and a separator strip extending along one side of the chevron strip and, a pair of pinch rings encircling said hub mandrel on opposite sides thereof with each of said pinch rings being embedded into the edges of said matrix elements whereby to wedge said matrix elements against said hub mandrel, said matrix elements, said pinch rings and said hub mandrel being further bonded together into a rigid elastic structure integral with said hub mandrel.

2. A regenerator matrix structure according to claim 1 wherein each of said pinch rings includes a flat base, a radially inboard side and a radially outboard side of a length greater than said inboard side extending from said flat base, and an inclined wedge side interconnecting said inboard side with said outboard side.

3. A method of assembling a multi-start involute regenerator matrix disk having a hub mandrel means and a plurality of matrix elements, said method including the steps of providing a magnetic field on the peripheral surface of said hub mandrel, feeding matrix elements into endwise abutment against the outer peripheral surface of said hub mandrel means to be retained magnetically thereto, said matrix elements being positioned in parallel spaced apart relationship to each other about the outer peripheral surface of said hub mandrel means, mechanically securing said matrix elements to said hub mandrel means by pressing annular pinch rings into the edges of said matrix elements on opposite sides of said hub mandrel means, concentrically and radially outward thereof and closely adjacent thereto to effect wedging of said matrix elements against the outer peripheral surface of said hub mandrel means, removing the magnetic field from said hub mandrel means, spirally wrapping said matrix elements about said hub mandrel means in an involute configuration and then bonding said matrix elements together into a rigid elastic structure.

4. A method of assembling a multi-start involute regenerator matrix disk according to claim 1 wherein each of said matrix elements includes a separator strip and a chevron matrix strip, each said chevron matrix strip having substantially parallel spaced apart fins interconnected to each other at alternating ends by flat crests at one end and flat valleys at the opposite end, said separator strip being positioned to abut against the flat crests of one of said chevron matrix strips and against the flat valleys of the next adjacent one of said chevron matrix strips when said matrix elements are spirally wound about said hub mandrel means, and wherein the end of each of said matrix strips in endwise abutment with the outer peripheral surface of said hub mandrel means is one of said fins of the said chevron matrix strip.

5. A method of assembling a multi-start involute regenerator matrix disk according to claim 4 wherein said separator strip of at least one of said matrix elements is of a greater length than the associated said chevron matrix strip of said matrix element whereby, during spiral winding of said matrix elements about said hub mandrel means, said separator strip may be wrapped for at least one additional revolution after termination of the wrapping of the remainder of said matrix elements.

6. A method of assembling a multi-start involute regenerator matrix disk having a hub mandrel means and a plurality of corrugated matrix strips and separator strips, each said separator strip being disposed between adjacent ones of said matrix strips, said method including the steps of magnetizing said hub mandrel means, feeding individual ones of said matrix strips and alternating separator strips in series orientation into endwise abutment against the outer peripheral surface of said hub mandrel means to be retained magnetically thereto, mechanically securing said corrugated matrix strips and separator strips to said hub mandrel means by pressing annular pinch rings into the assembly of said matrix strips and separator strips on opposite sides of said hub mandrel means concentrically and radially outward thereof and closely adjacent thereto to effect wedging of said matrix strips and said separator strips against the outer periphery of said hub mandrel means next adjacent to said pinch rings, de-magnetizing said hub mandrel means, spirally wrapping said corrugated matrix strips and said separator strips about said hub mandrel means in an involute configuration and, bonding said corrugated matrix strips and said separator strips together into a rigid elastic structure.

* * * * *